United States Patent
Mastrocola et al.

(10) Patent No.: US 9,634,603 B2
(45) Date of Patent: Apr. 25, 2017

(54) POWER LIMITING FOR MOTOR CURRENT CONTROLLERS

(71) Applicant: Simmonds Precision Products, Inc., Vergennes, VT (US)

(72) Inventors: Naison E. Mastrocola, Goshen, CT (US); Sameep Singh, Beavercreek, OH (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 72 days.

(21) Appl. No.: 14/834,328

(22) Filed: Aug. 24, 2015

(65) Prior Publication Data

US 2017/0063274 A1  Mar. 2, 2017

(51) Int. Cl.
*H02P 27/08* (2006.01)

(52) U.S. Cl.
CPC ................................ *H02P 27/08* (2013.01)

(58) Field of Classification Search
CPC .................................................. H02P 27/08
USPC ................................................. 318/519, 494
See application file for complete search history.

(56) References Cited

U.S. PATENT DOCUMENTS

| | | | | |
|---|---|---|---|---|
| 2009/0134817 A1* | 5/2009 | Jurngwirth | ......... | H05B 33/0851 315/307 |
| 2009/0315490 A1* | 12/2009 | Hoogzaad | ............... | H02P 23/20 318/376 |
| 2014/0181545 A1* | 6/2014 | Shrall | ................... | G06F 1/3206 713/320 |
| 2015/0326228 A1* | 11/2015 | Guthrie | ............... | H02M 3/1584 327/105 |

FOREIGN PATENT DOCUMENTS

JP     2010035259 A  *  2/2010

\* cited by examiner

*Primary Examiner* — Kawing Chan
(74) *Attorney, Agent, or Firm* — Kinney & Lange, P.A.

(57) ABSTRACT

A motor controller a pulse-width modulation (PWM) circuit, a power limit circuit, and an inverter. The PWM circuit is configured to output initial count outputs based on a current command. The power limit circuit includes a peak current detector, a divider, and a dynamic limiter. The power limit circuit is configured to provide updated count outputs based on the initial count outputs, a sensed current, and a power threshold. The inverter is controlled by the updated count outputs and configured to provide output power to a motor. The sensed current is sensed from the output power to the motor.

18 Claims, 2 Drawing Sheets

POWER LIMITING FOR MOTOR CURRENT CONTROLLERS

BACKGROUND

The present invention relates generally to motor controllers, and in particular to a system and method for limiting power in electric actuators.

Electric motors, such as those found in electromechanical brake systems, draw electric power from, for example, a power supply for operation. During peak power draw, the amount of power demanded can be substantial. To meet the peak power demand of electromechanical actuator systems, an appropriately sized power supply and associated conductors should be available. As the peak power demand increases, the size and weight of the power supply and associated components usually increase as well. In environments such as aircraft, however, there is an ever present desire to reduce the size and weight of on-board items. In addition, on aircraft, power availability is limited. It is desirable to limit the power consumed by each electric motor in order to limit the overall power consumed onboard the aircraft.

SUMMARY

A motor controller includes a pulse-width modulation (PWM) circuit, a power limit circuit, and an inverter. The PWM circuit is configured to output initial count outputs based on a current command. The power limit circuit is configured to provide updated count outputs based on the initial count outputs, a sensed current, and a power threshold. The inverter is controlled by the updated count outputs and configured to provide output power to a motor. The sensed current is sensed from the output power to the motor.

A method of limiting power provided to a motor includes providing, by a pulse-width modulation (PWM) circuit, initial count outputs based on a current command; producing, by a power limit circuit, updated count outputs based on the initial count outputs, a sensed current and a power threshold; controlling an inverter to produce power outputs based on the updated count outputs; driving, using the power outputs, a motor; and sensing the sensed current from the power outputs.

A power limit circuit includes a peak current detector, a divider, and a dynamic limiter. The power limit circuit is configured for use in a motor controller. The motor controller is configured to receive a current command and includes a pulse-width modulation (PWM) circuit configured to generate initial PWM counts, an inverter, a current sense circuit, and a motor. The peak current detector is configured to generate a peak current output based on a sensed current from the current sense circuit. The divider configured to divide a power threshold by the peak current output to generate a voltage limit. The dynamic limiter configured to generate updated PWM counts based on the voltage limit and the initial PWM counts. The updated PWM counts are provided as output to control the inverter.

DETAILED DESCRIPTION

A motor controller is disclosed herein that includes power limiting techniques for managing power consumption of the motor. The motor controller includes a power limit circuit that controls pulse width modulation (PWM) signals provided to an inverter. The inverter provides three-phase power to, for example, a motor of an electric brake actuator from a direct current (DC) power bus. The power limit circuit receives a sensed current at the output of the inverter. The power limit circuit determines a peak current from the sensed current. A power threshold is divided by the peak current to determine a voltage limit. The voltage limit is provided to a dynamic limit circuit. The dynamic limit circuit receives initial PWM counts and updates the counts based on the voltage limit. The output of the dynamic limit circuit is utilized to control the inverter. By limiting power at the current controller level, power may be controlled and limited at the individual motor level, which is desirable in systems that may have several motors contained in a single system.

Figure 1:
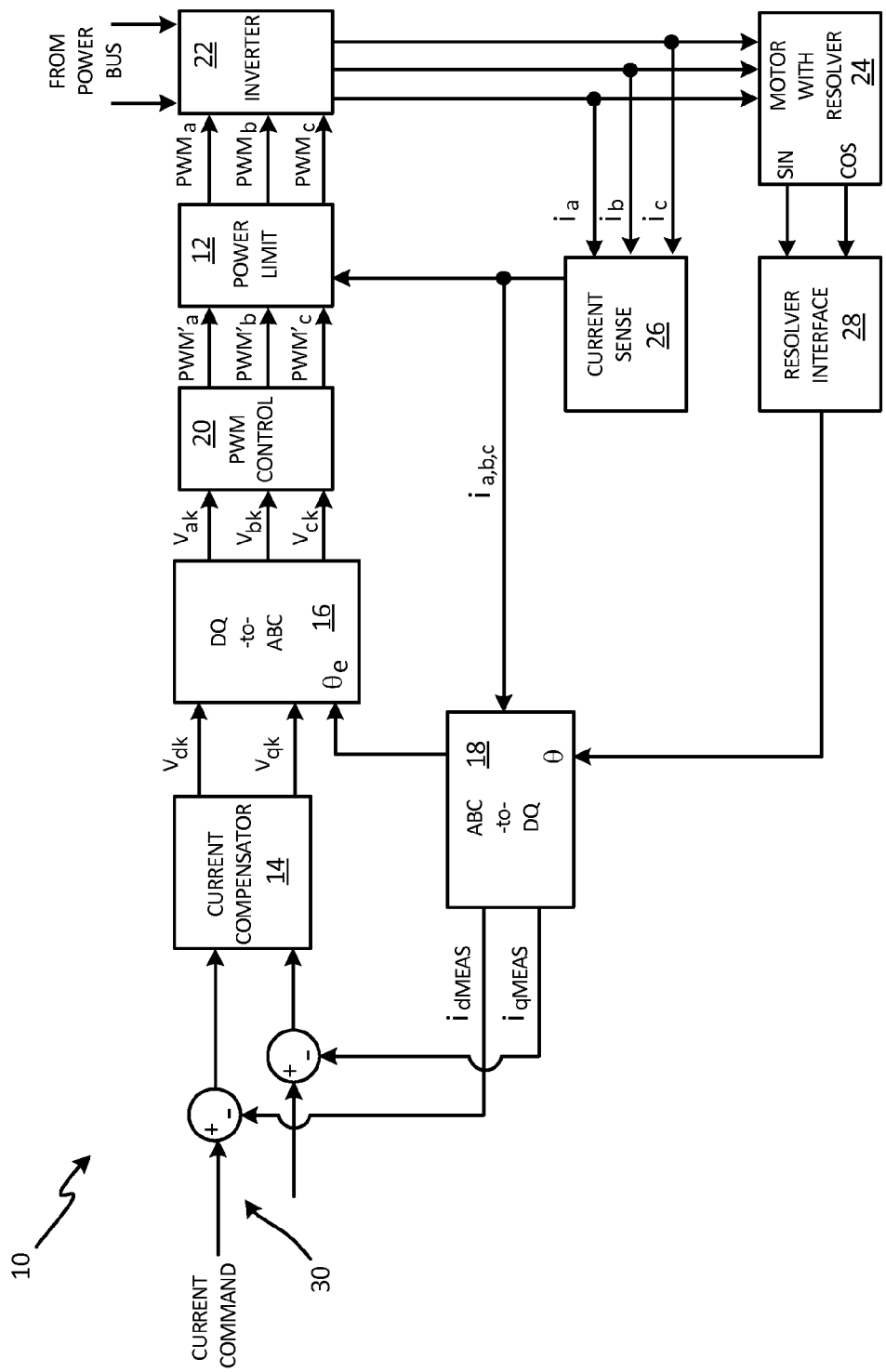
FIG. 1 is a block diagram illustrating a motor controller that includes a power limit circuit.

FIG. 1 is a block diagram illustrating motor controller 10 that includes power limit circuit 12. Controller 10 may be, for example, a current controller within an electric motor control system such as an electromechanical brake system onboard an aircraft. In the embodiment illustrated in FIG. 1, controller 10 includes power limit circuit 12, current compensator circuit 14, DQ-to-ABC circuit 16, ABC-to-DQ circuit 18, pulse width modulation (PWM) control circuit 20, inverter 22, motor 24, current sense circuit 26 and resolver interface circuit 28. Controller 10 receives current command 30 as input from, for example, outer control loops of the system. In the embodiment illustrated in FIG. 1, controller 10 is implemented utilizing a field-oriented control space vector modulation (FOC-SVM) motor control loop.

In an embodiment, controller 10 may be, for example, integrated within a nested loop feedback arrangement utilized to generate a motor drive signal from an input braking command (e.g., a force command) for an electric brake actuator. The nested loop feedback arrangement may include, for example, a current control loop, a velocity control loop, a position control loop, and a force control loop. Controller 10 may be, for example, a current controller that receives current command 30 from the velocity control loop. The motor current ($i_a$, $i_b$ and $i_c$) is directly proportional to torque (and, thus, braking force). The velocity control loop may be implemented as an outer loop that provides target commands to the inner current loop (i.e., controller 10) of the control system. Velocity commands are received from the position control loop and the force control loop. The velocity control loop controls the speed at which the actuator moves toward the brake stack. The position control loop is an outer loop to the velocity loop of the control system and enables control of the electromechanical actuator position. The force control loop may provide independent force control for each electromechanical actuator in the electromechanical braking system.

Motor 24 may include, for example, a resolver capable of determining a position and/or velocity of a rotor of motor 24. As illustrated in FIG. 1, the resolver of motor 24 may produce sine and cosine outputs based on, for example, the rotor and stator positions of motor 24. Resolver interface circuit 28 produces an output (A) indicative of, for example, the angular position of the rotor of motor 24 based on the sine and cosine outputs of the resolver of motor 24.

Motor 24 may be driven by a three-phase output from inverter 22. Inverter 22 may be implemented, for example, as a bridge inverter and receive a direct current (DC) input from an aircraft power bus or other power source. Current sense circuit 26 senses the current ($i_a$, $i_b$ and $i_c$) on each phase of the three-phase output from inverter 22 to motor 24. Current sense circuit 26 is any circuit capable of sensing current flowing through a conductor. Current sense circuit 26 outputs the sensed current ($i_a$, $i_b$ and $i_c$) to both power limit circuit 12 and ABC-to-DQ circuit 18. The output may be, for example, a vector representation of the three-phase sensed current ($i_a$, $i_b$ and $i_c$).

The position ($\theta$) of motor 24 from resolver interface circuit 18 is provided to ABC-to-DQ circuit 18 along with the sensed current ($i_a$, $i_b$ and $i_c$) from current sense circuit 26. ABC-to-DQ circuit 18 may be configured to perform, for example, a Clarke and Park transform to produce direct and quadrature feedback currents ($id_{meas}$ and $iq_{meas}$) from the three-phase sensed currents ($i_a$, $i_b$ and $i_c$). ABC-to-DQ circuit 18 is also configured to provide an output ($\theta_e$) indicative of the electrical position of the rotor of motor 24 to DQ-to-ABC circuit 16.

To complete the current control loop, the feedback current ($id_{meas}$ and $iq_{meas}$) is subtracted from the received current command 30. The resultant current command is provided to current compensator circuit 14. Current compensator circuit 14 may be implemented, for example, to receive the resultant current command and output a voltage ($Vd_k$ and $Vq_k$) indicative of a duty cycle. The output voltage ($Vd_k$ and $Vq_k$) of current compensator circuit 14 is provided as input to DQ-to-ABC circuit 16.

The output ($\theta_e$) from ABC-to-DQ circuit 18 is utilized by DQ-to-ABC circuit 16 to convert the output of current compensator circuit 14 into a three-phase voltage output ($Va_k$, $Vb_k$ and $Vc_k$) utilizing, for example, an inverse Park and Clarke transform. PWM control circuit 20 may be implemented to convert the three-phase voltage output ($Va_k$, $Vb_k$ and $Vc_k$) into initial PWM counts ($PWM'_a$, $PWM'_b$ and $PWM'_c$) for each leg of inverter 22. The initial PWM counts ($PWM'_a$, $PWM'_b$ and $PWM'_c$) are provided, along with the sensed current ($i_a$, $i_b$ and $i_c$) to power limit circuit 12.

Power limit circuit 12, which may be implemented, for example, in hardware and/or software, utilizes the sensed current ($i_a$, $i_b$ and $i_c$) and the initial PWM counts ($PWM'_a$, $PWM'_b$ and $PWM'_c$) to generate updated PWM counts ($PWM_a$, $PWM_b$ and $PWM_c$). The updated PWM counts ($PWM_a$, $PWM_b$ and $PWM_c$) are provided as output to control inverter 22. The updated PWM counts ($PWM_a$, $PWM_b$ and $PWM_c$) control, for example, switches of inverter 22 to convert a direct current (DC) input into a three-phase alternating current (AC) output for motor 24. The DC input may be received from, for example, a two hundred sixty volt aircraft power bus, a storage capacitor, a battery, or any other power source. The amount of voltage provided at the output of inverter 22 is directly proportional to the current drawn by motor 24. By controlling the PWM counts for the inverter, power limit circuit 12 is capable of controlling the voltage provided to, and the current consumed by, motor 24. By utilizing power limit circuit 12, power consumption is controlled for each motor 24 in the system.

Electromechanical brake systems may include, for example, eight motors for each actuator control system. Prior power limiting algorithms may limit power at the actuator control system level and not the motor level. For example, power may be limited to four thousand Watts for each actuator control system. In low power operation, if one of the eight motors stalls, that motor could draw a majority of the four thousand Watts, causing possible faults and taking away power from the other seven motors. Utilizing power limiting at the individual motor level prevents a faulty motor from drawing too much current. Further, by limiting power at the motor level, power may be better allocated in systems that have a limited number of functional motors. For example, if only three of the eight motors of an actuator system are functional, additional power may be allocated to the three functional motors accordingly.

Figure 2:
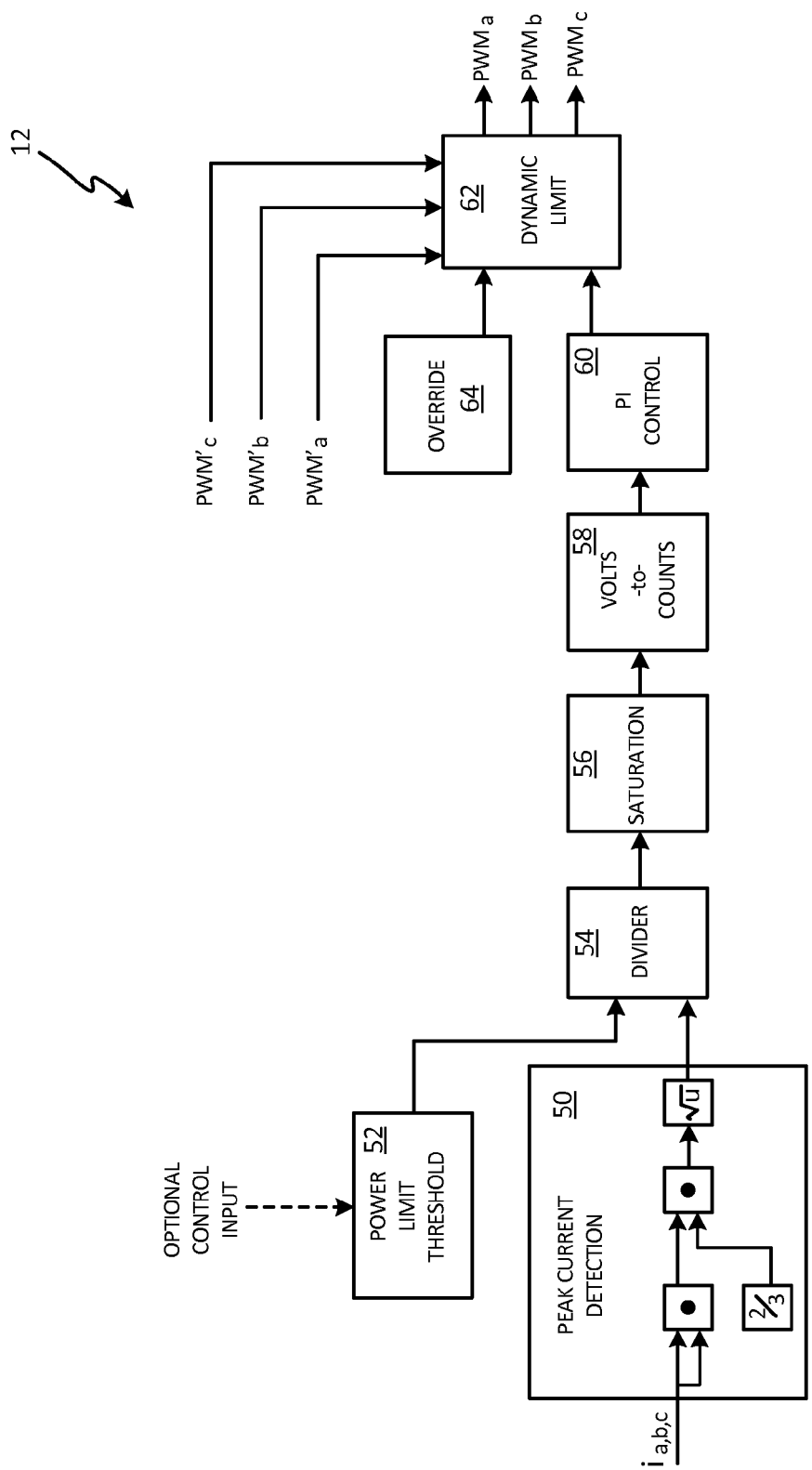
FIG. 2 is a block diagram illustrating a power limit circuit utilized in a motor controller.

FIG. 2 is a block diagram illustrating power limit circuit 12 utilized within motor controller 10. Power limit circuit 12 includes peak current detection circuit 50, power limit threshold 52, divider circuit 54, saturation circuit 56, volts-to-counts circuit 58, proportional-integral (PI) control circuit 60, dynamic limit circuit 62, and override circuit 64. Power limit threshold 52 may receive an optional input to facilitate a dynamic threshold. Power limit circuit 12 may be implemented, for example, in hardware and/or software.

Peak current detection circuit 50 determines an instantaneous peak current for the sinusoidal three-phase input currents ($i_a$, $i_b$ and $i_c$). Peak current detection circuit 50 may, for example, receive a vector representation of the three-phase input currents ($i_a$, $i_b$ and $i_c$) and determine the instantaneous peak current utilizing vector math as illustrated in FIG. 2. For example, the peak (i.e $I_q$ current) may be determined from a three-phase sinusoidal wave by obtaining the dot product of the current ($i_a$, $i_b$ and $i_c$) with itself, multiplying the result of the dot product by two-thirds, and taking the square root of that result. The output peak current of peak current detection circuit 50 is provided, along with power limit threshold 52 to divider circuit 54.

Power limit threshold 52 may indicate a maximum power consumption for motor 24. This threshold may be static or dynamic. For example, an optional input may be utilized by a controller, pilot, or any other input to set and/or update power limit threshold 52. Divider circuit 54 divides the threshold from power limit threshold 52 by the peak current from peak current detection circuit 50 to determine a voltage limit. Saturation circuit 56 may be utilized, for example, for divide-by-zero protection to eliminate unwanted output from power limit circuit 12.

Volts-to-counts circuit 58 may, for example, convert the voltage limit from divider circuit 54 through saturation circuit 56 into a value indicative of a duty cycle count. The duty cycle count may be, for example, a maximum duty cycle count value. The duty cycle count is provided as an output from volts-to-counts circuit 58 to PI control circuit 60. PI control circuit 60 is optional and may be implemented, for example, as a rate limiter. Because the time scale of power limit circuit 12 is much faster than current is pulled from the aircraft power bus, PI control circuit 60 is utilized to limit large, sudden changes in the duty cycle count and ensure there is not a large amount of jitter in the signal.

Dynamic limit circuit 62 receives the duty cycle count and the initial PWM counts ($PWM'_a$, $PWM'_b$ and $PWM'_c$). Dynamic limit circuit 62 may also receive input from optional override circuit 64. Override circuit 64 may be utilized, for example, to adjust and/or override the duty cycle input based on, for example, an operational mode or fault condition. For example, if an electromechanical actuator has eight motors and can consume four thousand Watts, there may be situations in which it is desirable to reallocate power to some of the eight motors. For example, if only three actuators are operational, it may be desirable to provide more power to those three motors and thus, override circuit 64 may adjust the duty cycle for those three motors. Override circuit 64 may be controlled, for example, automatically by a controller, manually, or using any other form of input.

Dynamic limit circuit 62 outputs the updated PWM counts ($PWM_a$, $PWM_b$ and $PWM_c$) based on the duty cycle count input, the initial PWM counts ($PWM'_a$, $PWM'_b$ and $PWM'_c$), and optional input from override circuit 64. For example, in one embodiment, if the initial PWM counts ($PWM'_a$, $PWM'_b$ and $PWM'_c$) are greater than the determined duty cycle count from volts-to-counts circuit 58, the updated PWM counts ($PWM_a$, $PWM_b$ and $PWM_c$) will be reduced to the value of the determined duty cycle count. This way, the power consumed by each individual motor 24 can be limited to a desired threshold. This is advantageous, for example, to limit overall power consumption of the system and to prevent single motors 24 of an electromechanical brake actuator from drawing too much power during, for example, a fault condition.

Discussion of Possible Embodiments

The following are non-exclusive descriptions of possible embodiments of the present invention.

A motor controller includes a pulse-width modulation (PWM) circuit, a power limit circuit, and an inverter. The PWM circuit is configured to output initial count outputs based on a current command. The power limit circuit is configured to provide updated count outputs based on the initial count outputs, a sensed current, and a power threshold. The inverter is controlled by the updated count outputs and configured to provide output power to a motor. The sensed current is sensed from the output power to the motor.

The motor controller of the preceding paragraph can optionally include, additionally and/or alternatively, any one or more of the following features, configurations and/or additional components:

A further embodiment of the foregoing motor controller, wherein the power limit circuit includes a peak current detector configured to output a peak current value based on the sensed current, a divider configured to divide the power threshold by the peak current value to generate a voltage limit, and a dynamic limiter configured to generate the updated count outputs based on the voltage limit and the initial count inputs.

A further embodiment of any of the foregoing motor controllers, wherein the power limit circuit further comprises a count converter that generates a maximum count value based on the voltage limit, wherein the dynamic limiter generates the updated count outputs based on the maximum count value.

A further embodiment of any of the foregoing motor controllers, wherein the power limit circuit further comprises a proportional-integral control configured to limit a change rate of the maximum count value.

A further embodiment of any of the foregoing motor controllers, wherein the power limit circuit further comprises an override circuit that provides an override input to the dynamic limiter, wherein the dynamic limiter generates the updated count outputs based further on the override input.

A further embodiment of any of the foregoing motor controllers, further including a resolver interface configured to determine a position of a rotor of the motor, and a DQ-to-ABC circuit configured to convert a direct current voltage into a three-phase voltage based upon the current command and the position of the rotor, wherein the three-phase voltage is provided to the PWM circuit, and wherein the PWM circuit generates the initial count outputs based on the three-phase voltage.

A further embodiment of any of the foregoing motor controllers, further including an ABC-to-DQ circuit configured to convert the sensed current into a direct current output, wherein the current command is adjusted based on the direct current output.

A further embodiment of any of the foregoing motor controllers, wherein the motor is an electromechanical brake actuator that includes a resolver, wherein the resolver provides sine and cosine signals to the resolver interface based on the position of the rotor of the motor and a position of a stator of the motor.

A method of limiting power provided to a motor includes providing, by a pulse-width modulation (PWM) circuit, initial count outputs based on a current command; producing, by a power limit circuit, updated count outputs based on the initial count outputs, a sensed current and a power threshold; controlling an inverter to produce power outputs based on the updated count outputs; driving, using the power outputs, a motor; and sensing the sensed current from the power outputs.

The method of the preceding paragraph can optionally include, additionally and/or alternatively, any one or more of the following features, configurations and/or additional components:

A further embodiment of the foregoing method, wherein producing, by the power limit circuit, updated count outputs includes: outputting, by a peak current detector, a peak current value based on the sensed current; dividing the power threshold by the peak current value to generate a voltage limit; and generating, by a dynamic limiter, the updated count outputs based on the voltage limit and the initial count inputs.

A further embodiment of any of the foregoing methods, wherein producing, by the power limit circuit, updated count outputs further includes generating, by a count converter, a maximum count value based on the voltage limit, and wherein generating, by the dynamic limiter, the updated count outputs further comprises generating the updated count outputs based on the maximum count value.

A further embodiment of any of the foregoing methods, wherein producing, by the power limit circuit, updated count outputs further includes limiting, by a proportional-integral control, a change rate of the maximum count value.

A further embodiment of any of the foregoing methods, wherein producing, by the power limit circuit, updated count outputs further includes providing, by an override circuit, an override input to the dynamic limiter, and wherein generating, by the dynamic limiter, the updated count outputs further comprises generating the updated count outputs based on the override input.

A further embodiment of any of the foregoing methods, further including determining, by a resolver interface, a position of a rotor of the motor; converting, by a DQ-to-ABC circuit, a direct current voltage into a three-phase voltage based upon the current command and the position of the rotor; and providing the three-phase voltage to the PWM circuit; wherein providing, by the PWM circuit, the initial count outputs comprises providing the initial count outputs based on the three-phase voltage.

A further embodiment of any of the foregoing methods, further including converting, by an ABC-to-DQ circuit, the sensed current into a direct current output; and adjusting the current command based on the direct current output.

A power limit circuit includes a peak current detector, a divider, and a dynamic limiter. The power limit circuit is configured for use in a motor controller. The motor controller is configured to receive a current command and includes a pulse-width modulation (PWM) circuit configured to generate initial PWM counts, an inverter, a current sense circuit, and a motor. The peak current detector is configured to generate a peak current output based on a sensed current from the current sense circuit. The divider configured to divide a power threshold by the peak current output to generate a voltage limit. The dynamic limiter configured to generate updated PWM counts based on the voltage limit and the initial PWM counts. The updated PWM counts are provided as output to control the inverter.

The power limit circuit of the preceding paragraph can optionally include, additionally and/or alternatively, any one or more of the following features, configurations and/or additional components:

A further embodiment of the foregoing power limit circuit, further including a count converter configured to generate a maximum count value based on the voltage limit, wherein the dynamic limiter is configured to generate the updated count outputs based on the maximum count value.

A further embodiment of any of the foregoing power limit circuits, further including a proportional-integral control configured to limit a change rate of the maximum count value.

A further embodiment of any of the foregoing power limit circuits, further including an override circuit configured to provide an override input to the dynamic limiter, wherein the dynamic limiter is configured to generate the updated count outputs based further on the override input.

A further embodiment of any of the foregoing power limit circuits, wherein the power limit circuit is configured to receive a threshold control input configured to control the power threshold.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A motor controller comprising:
 a pulse-width modulation (PWM) circuit configured to output initial count outputs based on a current command;
 a power limit circuit configured to provide updated count outputs based on the initial count outputs, a sensed current, and a power threshold; and
 an inverter controlled by the updated count outputs and configured to provide output power to a motor;
 wherein the sensed current is sensed from the output power to the motor;
 wherein the power limit circuit comprises:
  a peak current detector configured to output peak current value based on the sensed current;
  a divided configured to divide the power threshold by the peak current value to generate a voltage limit; and
  a dynamic limiter configured to generate the updated count outputs based on the voltage limit and the initial count inputs.

2. The motor controller of claim 1, wherein the power limit circuit further comprises a count converter that generates a maximum count value based on the voltage limit, wherein the dynamic limiter generates the updated count outputs based on the maximum count value.

3. The motor controller of claim 2, wherein the power limit circuit further comprises a proportional-integral control configured to limit a change rate of the maximum count value.

4. The motor controller of claim 3, wherein the power limit circuit further comprises an override circuit that provides an override input to the dynamic limiter, wherein the dynamic limiter generates the updated count outputs based further on the override input.

5. The motor controller of claim 1, further comprising:
 a resolver interface configured to determine a position of a rotor of the motor; and
 a DQ-to-ABC circuit configured to convert a direct current voltage into a three-phase voltage based upon the current command and the position of the rotor, wherein the three-phase voltage is provided to the PWM circuit, and wherein the PWM circuit generates the initial count outputs based on the three-phase voltage.

6. The motor controller of claim 5, further comprising:
 an ABC-to-DQ circuit configured to convert the sensed current into a direct current output, wherein the current command is adjusted based on the direct current output.

7. The motor controller of claim 5, wherein the motor is an electromechanical brake actuator that includes a resolver, wherein the resolver provides sine and cosine signals to the resolver interface based on the position of the rotor of the motor and a position of a stator of the motor.

8. A method of limiting power provided to a motor, the method comprising:
 providing, by a pulse-width modulation (PWM) circuit, initial count outputs based on a current command;
 producing, by a power limit circuit, updated count outputs based on the initial count outputs, a sensed current and a power threshold;
 controlling an inverter to produce power outputs based on the updated count outputs;
 driving, using the power outputs, a motor; and
 sensing the sensed current from the power outputs;
 wherein producing, by the power limit circuit, updated count outputs comprises:
  Outputting, by a peak current detector, a peak current value based on the sensed current;
  Dividing the power threshold by the peak current value to generate a voltage limit; and
  Generating, by a dynamic limiter, the updated count outputs based on the voltage limit and the initial count inputs.

9. The method of claim 8, wherein producing, by the power limit circuit, updated count outputs further comprises generating, by a count converter, a maximum count value based on the voltage limit, and wherein generating, by the dynamic limiter, the updated count outputs further comprises generating the updated count outputs based on the maximum count value.

10. The method of claim 9, wherein producing, by the power limit circuit, updated count outputs further comprises limiting, by a proportional-integral control, a change rate of the maximum count value.

11. The method of claim 10, wherein producing, by the power limit circuit, updated count outputs further comprises providing, by an override circuit, an override input to the dynamic limiter, and wherein generating, by the dynamic limiter, the updated count outputs further comprises generating the updated count outputs based on the override input.

12. The method of claim 8, further comprising:
determining, by a resolver interface, a position of a rotor of the motor;
converting, by a DQ-to-ABC circuit, a direct current voltage into a three-phase voltage based upon the current command and the position of the rotor; and
providing the three-phase voltage to the PWM circuit;
wherein providing, by the PWM circuit, the initial count outputs comprises providing the initial count outputs based on the three-phase voltage.

13. The method of claim 12, further comprising:
converting, by an ABC-to-DQ circuit, the sensed current into a direct current output; and
adjusting the current command based on the direct current output.

14. A power limit circuit for use in a motor controller, wherein the motor controller is configured to receive a current command and includes a pulse-width modulation (PWM) circuit configured to generate initial PWM counts, an inverter, a current sense circuit, and a motor, and wherein the power limit circuit comprises:
 a peak current detector configured to generate a peak current output based on a sensed current from the current sense circuit;
 a divider configured to divide a power threshold by the peak current output to generate a voltage limit;
 a dynamic limiter configured to generate updated PWM counts based on the voltage limit and the initial PWM counts, wherein the updated PWM counts are provided as output to control the inverter.

15. The power limit circuit of claim 14, further comprising a count converter configured to generate a maximum count value based on the voltage limit, wherein the dynamic limiter is configured to generate the updated count outputs based on the maximum count value.

16. The power limit circuit of claim 15, further comprising a proportional-integral control configured to limit a change rate of the maximum count value.

17. The power limit circuit of claim 16, further comprising an override circuit configured to provide an override input to the dynamic limiter, wherein the dynamic limiter is configured to generate the updated count outputs based further on the override input.

18. The power limit circuit of claim 14, wherein the power limit circuit is configured to receive a threshold control input configured to control the power threshold.

\* \* \* \* \*